US008659388B2

(12) United States Patent
Biondo et al.

(10) Patent No.: US 8,659,388 B2
(45) Date of Patent: Feb. 25, 2014

(54) VARIABLE STRENGTH WIRELESS COMMUNICATION SYSTEM

(75) Inventors: William A. Biondo, Beverly Hills, MI (US); David T. Proefke, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1169 days.

(21) Appl. No.: 12/171,153

(22) Filed: Jul. 10, 2008

(65) Prior Publication Data

US 2010/0007462 A1 Jan. 14, 2010

(51) Int. Cl.

| | |
|---|---|
| ***B60R 25/00*** | (2013.01) |
| ***G05B 19/00*** | (2006.01) |
| ***H04L 9/14*** | (2006.01) |
| ***H04B 1/38*** | (2006.01) |
| ***H04M 1/00*** | (2006.01) |

(52) U.S. Cl.
USPC ..... 340/5.72; 340/5.23; 340/5.64; 340/426.1; 455/73; 455/569.2

(58) Field of Classification Search
USPC ........................................................ 340/5.72
See application file for complete search history.

(56) References Cited

U.S. PATENT DOCUMENTS

| | | | | |
|---|---|---|---|---|
| 5,933,074 | A * | 8/1999 | Settles et al. | 340/426.17 |
| 6,208,239 | B1 * | 3/2001 | Muller et al. | 340/426.35 |
| 6,853,853 | B1 * | 2/2005 | Van Wiemeersch et al. | 455/569.2 |
| 6,856,239 | B1 * | 2/2005 | Hicks | 340/5.7 |
| 7,545,254 | B2 * | 6/2009 | Brillon | 340/5.61 |
| 7,675,964 | B2 | 3/2010 | Friedrich | |
| 2006/0202798 | A1 * | 9/2006 | Baumgartner et al. | 340/5.61 |
| 2006/0208854 | A1 * | 9/2006 | Baumgartner et al. | 340/5.61 |
| 2007/0064838 | A1 * | 3/2007 | Anderson et al. | 375/329 |
| 2007/0103271 | A1 * | 5/2007 | King et al. | 340/5.72 |
| 2007/0109093 | A1 * | 5/2007 | Matsubara et al. | 340/5.61 |
| 2008/0088411 | A1 * | 4/2008 | Ghabra et al. | 340/5.64 |
| 2009/0168919 | A1 * | 7/2009 | Sato et al. | 375/295 |

FOREIGN PATENT DOCUMENTS

| | | |
|---|---|---|
| DE | 100 50 878 A1 | 5/2002 |

OTHER PUBLICATIONS

German Office Action for German Application No. 10 2009 031 353.2-31 mailed Nov. 26, 2010.

* cited by examiner

*Primary Examiner* — Jennifer Mehmood
*Assistant Examiner* — Fekadeselassie Girma
(74) *Attorney, Agent, or Firm* — Ingrassia Fisher & Lorenz, P.C.

(57) ABSTRACT

A wireless communication system is provided. The communication system comprises a key fob comprising a wireless transmitter adapted to transmit a first signal having a first transmission field strength and first transmission duration, and a second signal having a second transmission field strength and second transmission duration and a vehicle comprising a wireless receiver adapted to receive the first and second signals.

7 Claims, 4 Drawing Sheets

VARIABLE STRENGTH WIRELESS COMMUNICATION SYSTEM

TECHNICAL FIELD

Embodiments of the subject matter described herein relate generally to wireless communication. More particularly, embodiments of the subject matter relate to wireless communication between a transmitter and a polling receiver.

BACKGROUND

Unlicensed radiofrequency transmitters operate under constraints imposed by the Federal Communications Commission (FCC). Unlicensed transmitters are commonly used in key fobs for remotely performing various vehicular functions, such as locking or unlocking the doors or hatches of a vehicle, activating or de-activating an alarm, unlatching a door, trunk, or other latching closure, or operating a powered lift gate. Accordingly, vehicles are usually equipped with a wireless receiver to receive signals from key fobs and other transmitters.

Wireless receivers, however, draw electrical power from the battery of a vehicle. To reduce the draw on the battery, receivers can be set to poll periodically, rather than running constantly. During polling, the receiver can activate completely and be placed in a state of increased electrical power usage for the purpose of detecting a signal for a short period of time. Between activations, a controller can place the receiver in a state of low- or no-power usage, conserving the vehicle's battery life.

Thus, the timeliness of a vehicle's response to the manipulation of a key fob (e.g., pressing a button) transmitting a signal can depend on various factors, including signal transmission strength of the wireless transmitter, the duration of transmission of the signal, interference from nearby sources, and synchronicity of polling and signal transmit rates. Responsiveness of the vehicle to signals from a key fob can therefore vary.

BRIEF SUMMARY

An apparatus is provided for a wireless communication system. In at least one embodiment, the wireless communication system can comprise a key fob comprising a wireless transmitter adapted to transmit a first signal having a first transmission field strength and first transmission duration, and a second signal having a second transmission field strength and second transmission duration and a vehicle comprising a wireless receiver adapted to receive the first and second signals.

A method of transmitting a wireless key fob signal is provided. In one embodiment, the method can comprise transmitting a first key fob signal at a first transmission field strength, the first signal having a first transmission duration and transmitting a second key fob signal after the first signal, the second signal having a second transmission field strength and a second transmission duration, wherein the first transmission field strength is less than the second transmission field strength and the first transmission duration is longer than the second transmission duration.

A wireless communication system is provided. In one embodiment, the wireless communication system can comprise a wireless transmitter adapted to transmit a first signal having a first transmission field strength and first transmission duration, and a second signal having a second transmission field strength and second transmission duration, the first transmission field strength is less than the second transmission field strength and the first transmission duration is greater than the second transmission duration and a wireless receiver adapted to receive the first and second signals, where the wireless receiver adapted to detect signals at a signal detection interval.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
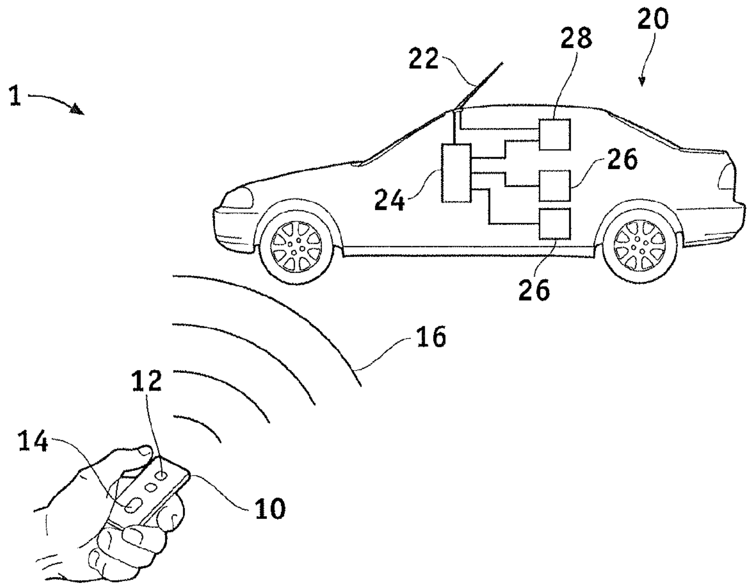
FIG. 1 is a schematic diagram of a wireless communication system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a wireless transmitter or receiver or a component thereof may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein can be the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links.

"Connected/Coupled"—The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, such as a wireless antenna and control system, additional intervening elements, devices, features, or components may be present in an embodiment of the depicted subject matter.

For the sake of brevity, conventional techniques related to signal processing, RF signal transmission, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

FIG. 1 illustrates a wireless communication system 1 comprising a key fob 10 and a vehicle 20. The key fob 10 comprises a wireless transmitter (not shown). The vehicle 20 comprises a wireless antenna 22 coupled to a control system 24. The combined wireless antenna 22 and control system 24 can be known as a wireless receiver. A signal 16 can be transmitted by the key fob 10 through the use of its wireless transmitter, conveying information to the vehicle 20. The key fob 10 can comprise buttons such as a door lock/unlock button 12 and a panic button 14. The control system 24 can be further coupled to electronic devices 26 throughout the vehicle 20, such as an alarm system or the vehicle's door lock system.

Although a key fob 10 is depicted, any of a variety of wireless devices engaged in radiofrequency (RF) data transmission can embody the wireless transmitter. Some devices can include a remote garage door opener, a home automation interaction device, wireless activation of electronic entertainment devices, and the like. Preferably, the wireless transmitter is an intentional radiating device adapted to transmit pulsed signals. Similarly, although the wireless receiver is depicted as the combination of a wireless antenna 22 and a control system 24, other wireless receivers can also be used, such as an integrated device.

The vehicle 20 can supply power to the wireless antenna 22 and control system 24 from a battery 28. The battery 28 can have a finite amount of electrical power storage, resulting in exhaustion if used by the wireless receiver without adequate opportunity to replenish the electrical power through some appropriate method, such as charging from an alternator or operation of a fuel cell. Accordingly, reducing the wireless receiver's use of electrical power from the battery 28 is preferable and can be accomplished by polling.

Figure 2:
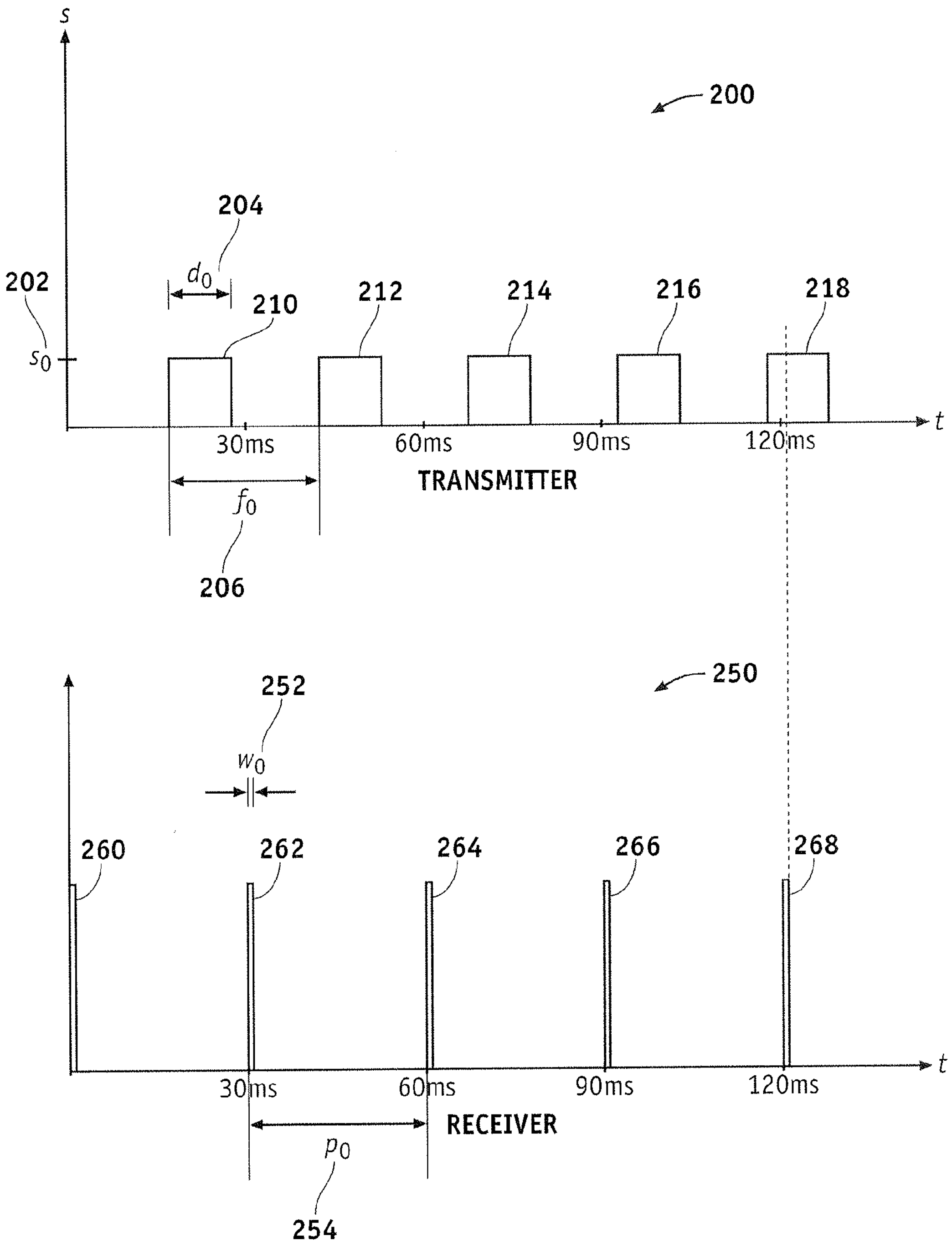
FIG. 2 is a signal diagram of an embodiment of a wireless transmitter and receiver.

With reference to FIG. 2, operation of an exemplary wireless transmitter/receiver pair is shown. The transmission pattern 200 shows a series of pulsed signal transmissions 210, 212, 214, 216, 218. The x-axis represents increasing time t, measured in milliseconds and demarcated at 30 ms intervals. The y-axis represents increased transmission field strength s, and is shown with relative strength. As shown in FIG. 2, each pulsed signal transmission 210, 212, 214, 216, 218 can have a transmission field strength 202 of $s_0$ and a transmission duration 204 of $d_0$. The initiation of a pulsed signal transmission can occur at a signal transmit rate or frequency 206 of $f_0$, which can be different than the frequency of the electromagnetic spectrum upon which the wireless transmitter operates. Thus, a wireless transmitter can send a regular, repeated pulsed signal transmission at a regular frequency or signal transmit rate, as shown. The number of pulsed transmissions can be configured in each embodiment, as desired. Preferably, the signals each convey the same information. Accordingly, reception by the wireless receiver of a complete transmission of any of the signals would be sufficient to convey the information, such as a door lock/unlock command.

With continued reference to FIG. 2, the receiver operation pattern 250 is also shown. To reduce power usage, the wireless receiver can operate at full power during only regular intervals, or when a signal is detected. Thus, the wireless receiver can operate in a low- or no-power mode during which the receiver component or components draws little to no electrical power in one operational mode and alternatively operate in a full-power mode during which the receiver component or components draws sufficient electrical power to operate in a state which enables it to receive wireless transmissions. This operational mode switching can be known as polling. The wireless receiver can be changed between operational modes through a control system or systems or as part of the receiver programming.

As shown in FIG. 2, the receiver operation pattern 250 illustrates a wireless receiver operating in a polling mode. The x-axis can represent increasing time t, while the extension along the y-axis represents an activation of the wireless receiver from low- or no-power mode into full-power mode. As shown, the receiver can have receiver activations 260, 262, 264, 266, 268 at a regular polling frequency 254 of $p_0$. The receiver can be active for a window 252 $w_0$ of suitable length, such as 1-5 ms, depending on the embodiment. In the illustrated embodiment, the interval between activations of the receiver is 30 ms, though other periods are also possible, as suitable to the embodiment. Similarly, the window 252 can be about 2 ms long, though windows of other durations can also be used.

Preferably, the polling frequency 254 is associated with the frequency 206 to produce synchronicity. As shown in FIG. 2, the pulsed signal transmissions 210, 212, 214, 216, 218 can have a transmission duration 204 greater than the window 252, but smaller than the interval between activations 260, 262, 264, 266, 268. Thus, the first four pulsed signal transmissions 210, 212, 214, 216 occur during intervals between receiver activations, but the fifth pulsed signal transmission 218 occurs during the fifth receiver activation 268, the synchronization of which is shown by a dashed line. Because the receiver is activated during a portion of the transmission 218, the receiver can be configured to remain in a full power, or active, mode in response to reception of all or part of the pulsed signal transmission 218. Additionally, the receiver can be configured to remain in an active mode until it receives a complete pulsed signal transmission.

Thus, the polling frequency 254 and signal transmission frequency 206, or signal transmit rate, can be preconfigured such that the wireless receiver is active during at least one portion of a signal transmission before wireless transmitter ends the cycle of regular pulsed transmissions. In some embodiments, the wireless receiver can be coupled to a system or component which can initiate an acknowledging signal, indicating that the pulsed signal has been received. The transmitter can cease repetitions of the pulsed signal in response to receiving the acknowledging signal.

With reference back to FIG. 1, the key fob 10 can be adapted to transmit the signal 16 conveying a variety of useful commands, requests, and responses, among other types of communication. After manipulation of a button or other type of input, the key fob 10 can repeatedly transmit a wireless signal 16 conveying information to the wireless receiver at a signal transmit rate. The wireless receiver can poll at a polling frequency which, in conjunction with the signal transmit rate, can result in an overlap with at least a portion of the transmission. Preferably, the signal transmit rate is faster than the polling frequency or, conversely, the interval between receiver activations is longer than the interval between transmissions of the signal.

The wireless receiver can activate for at least one period of its polling frequency, thereby remaining in full power mode for a sufficient interval to receive at least one complete transmission of the signal 16 from the key fob 10. In some embodiments, if the wireless receiver has not received a complete signal transmission upon reaching the end of a period of full power mode, it can remain active for a longer period of time. The period of full power operation can be predetermined or adjusted to end with the reception of a complete signal.

Transmission of the signal 16 for some wireless RF devices is regulated by the FCC. To comply with some portions of the FCC regulations, transmissions are limited by the maximum average transmission strength per amount of time. For some transmitters, a transmission can not exceed an average field strength of 20 decibels (dB) per 100 milliseconds, as observed by an antenna at a certain distance, such as 3 meters. Field strength can also be expressed in terms of decibel millivolts per meter (dBmV/m). As observed at 3 meters, 20 dB corresponds to a strength of 0.01 dBmV/m over a 100 millisecond (ms) transmission.

As the field strength is limited to an average per 100 ms period, a stronger field strength transmission can be transmitted for a shorter period of time, thereby not exceeding the average strength limit, while increasing transmission range through the increased field strength. Thus, if a transmission were to occur for only 50 ms, it could have a field strength of 0.02 dBmV/m. Similarly, a 10 ms transmission could have a field strength of 0.1 dBmV/m. 1 dBmV/m is equal to 1,000 decibel microvolts per meter or dBμV/m. Accordingly, a 100 dBμV/m field strength corresponds to a 10 ms transmission duration.

With reference again to FIG. 2, the pulsed signal transmission 210, 212, 214, 216, 218 can have a transmission field strength 202 of $s_0$ and a transmission duration 204 of $d_0$. To comply with FCC standards, the field strength 202 and transmission duration 204 preferably do not exceed an average strength of 0.01 dBmV/m, or 10 dBμV/m, over a 100 ms transmission duration. Some acceptable pairings of transmission field strength and transmission duration can include 50 dBμV/m for 15 ms, 25 dBμV/m for 20 ms, 20 dBμV/m for 40 ms, 20 dBμV/m for 50 ms, and so on.

Figure 3:
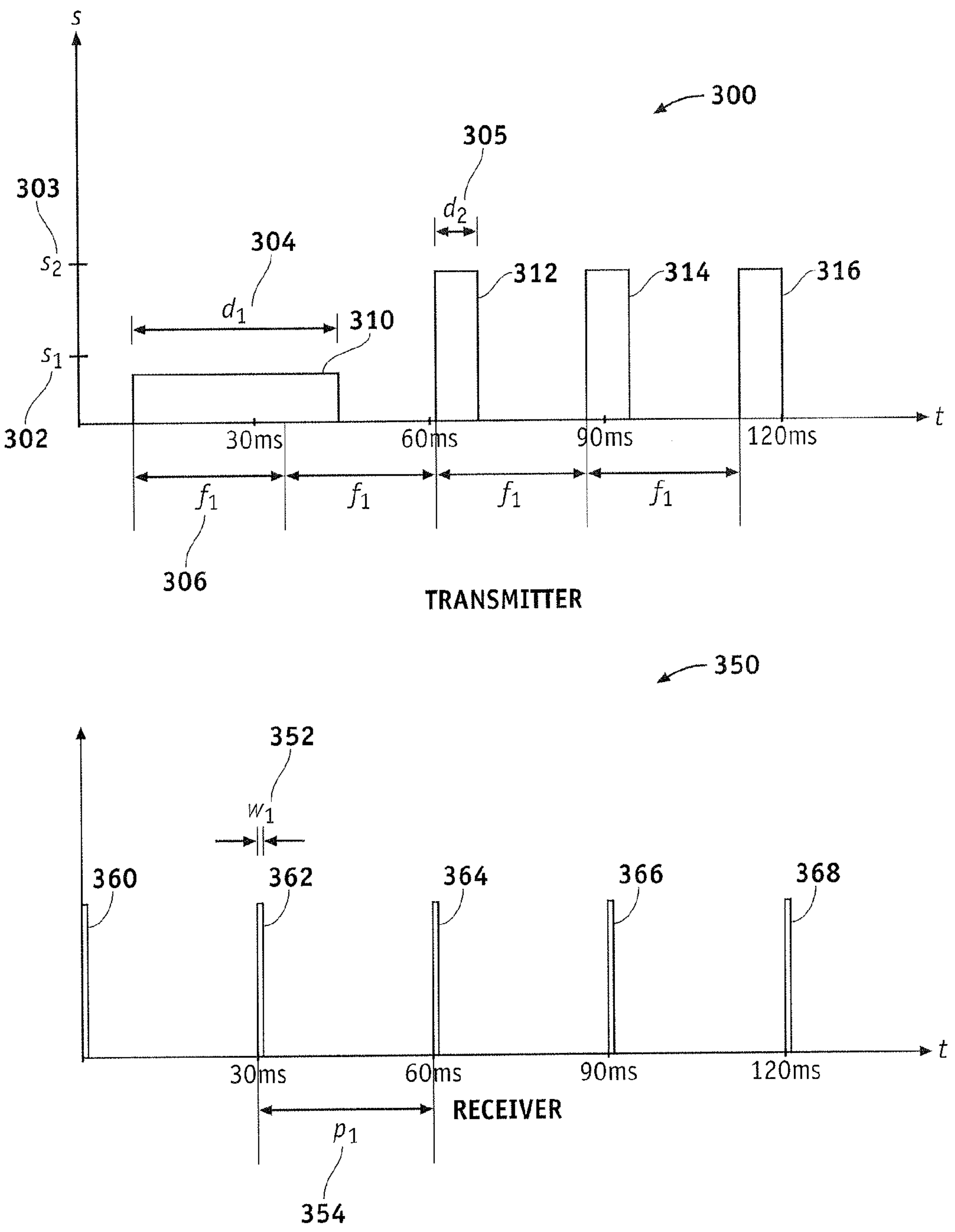
FIG. 3 is a signal diagram of another embodiment of a wireless transmitter and receiver.

With reference to FIG. 3, an irregular transmission pattern 300 is illustrated. Additionally, unless otherwise specified, the receiver activations 350 are substantially similar to those described with respect to FIG. 2, except that the indicators of the window 352 and polling frequency 354 have been incremented by 1 and the component numbers have been incremented by 100. Additionally, the signal transmit rate or frequency 306, $f_1$, is constant, though it can vary, and can be greater than the polling frequency 354, $p_1$. Accordingly, the interval between signal transmissions can be shorter than the interval between receiver activations.

The transmission pattern 300 has a first pulsed signal transmission 310 with a first transmission field strength 302 of $s_1$ and first transmission duration 304 of $d_1$. The second pulsed signal transmission 312 can have a second transmission field strength 303 of $s_2$ and second transmission duration 305 of $d_2$. Subsequent pulsed signal transmissions 314, 316 can have substantially the same transmission field strength 303 $s_2$ and transmission duration 305 $d_2$. Preferably, the first transmission field strength 302 is weaker or lower than the second transmission field strength 303. Additionally, the first transmission duration 304 is longer than the second transmission duration 305.

In some embodiments, the first transmission duration 304 is longer than the interval between successive signal transmissions, as shown. When the transmission duration 304 is longer than the interval between regular transmissions at the frequency 306 $f_1$, the signal transmission 310 can be completed and the next transmission begun at the following interval corresponding to the frequency 306 $f_1$.

Additionally, the first signal transmission 310 is preferably longer than the interval between receiver activations 360, 362 corresponding to the polling frequency 354, $p_1$. Accordingly, preferably the receiver will activate during at least a portion of the first signal transmission 310 and remain in full-power mode and active to receive the second signal transmission 312.

Preferably, the second signal transmission 312 is synchronized with the frequency 306 $f_1$ and has a second transmission field strength 303 $s_2$ which is greater than the first transmission field strength 302 $s_1$. To maintain a constant average transmission field strength over a given time duration, the second transmission duration 305 of $d_2$ can be less than the first transmission duration 304 of $d_1$.

In some embodiments, the first transmission field strength 302 can be approximately 75 dBμV/m, though strengths as low as 60 dBμV/m and as high as 85 dBμV/m can also be used. The second transmission field strength 303 can be approximately 95 dBμV/m, though a strength as low as 80 dBμV/m and as high as 110 dBμV/m can also be used. Similarly, in certain embodiments, the first transmission duration 304 can be between 80 and 200 ms, while the second transmission duration 305 in certain embodiments can be between 10 and 50 ms.

When a pulsed signal is transmitted with a relatively low transmission field strength, it is susceptible to interference and range limitations which do not affect as greatly pulsed signals with a relatively high transmission field strength. Consequently, the first signal transmission 310 cannot be reliably received by the wireless receiver at as great a distance as the second signal transmission 312. The first signal transmission 310, however, has an increased chance of synchronizing with a receiver activation because the first signal transmission duration 304 is longer than the interval between receiver activations. Therefore, when the first transmission field strength 302 is sufficiently strong to reach the wireless receiver, the wireless receiver can detect at least a portion of the first signal transmission 310 and activate the receiver to full-power mode. As subsequent transmissions have a greater transmission field strength $s_2$, if the first signal transmission 310 is detected, the subsequent transmissions should additionally be received, resulting in complete signal transmission as soon as the end of the second signal transmission 312.

In some instances, the first transmission field strength 302 can be insufficient to be detected by the wireless receiver, for reasons of range, interference, and the like. Subsequent transmissions, however, have an increased transmission field strength with a correspondingly shorter transmission duration $d_2$. Thus, while subsequent signal transmissions 312, 314, 316 can have a comparatively greater transmission field strength, 303 and can be more likely to reach the wireless receiver over greater distances, each can have a smaller individual chance of synchronizing with a receiver activation and can require several repetitions of the transmission before synchronization.

In an embodiment where the wireless transmission is originating from a key fob and intended for conveyance of information to a vehicle, a user can benefit from the irregular signal transmission pattern 300. Where a user initiates a signal in close proximity to the vehicle, the response time by the vehicle after transmission is likely after detection of the lower strength transmission which has a long signal transmission duration. Accordingly, users will be able to quickly unlock the car doors, and such, when near the vehicle. Additionally, when a user is distant from a vehicle, the first transmission can be transmitted at a transmission field of insufficient strength to be received by the vehicle. Subsequent transmissions, however, can have a higher transmission field strength and be more likely to be received by the vehicle from the greater distance. While the response time can be longer as a result of polling synchronicity between the transmitter and the receiver, because the user is farther from the vehicle, an extremely fast response time is not as desirable as surety of reception of the signal. Accordingly, the irregular transmission pattern provides benefits in both situations.

Figure 4:
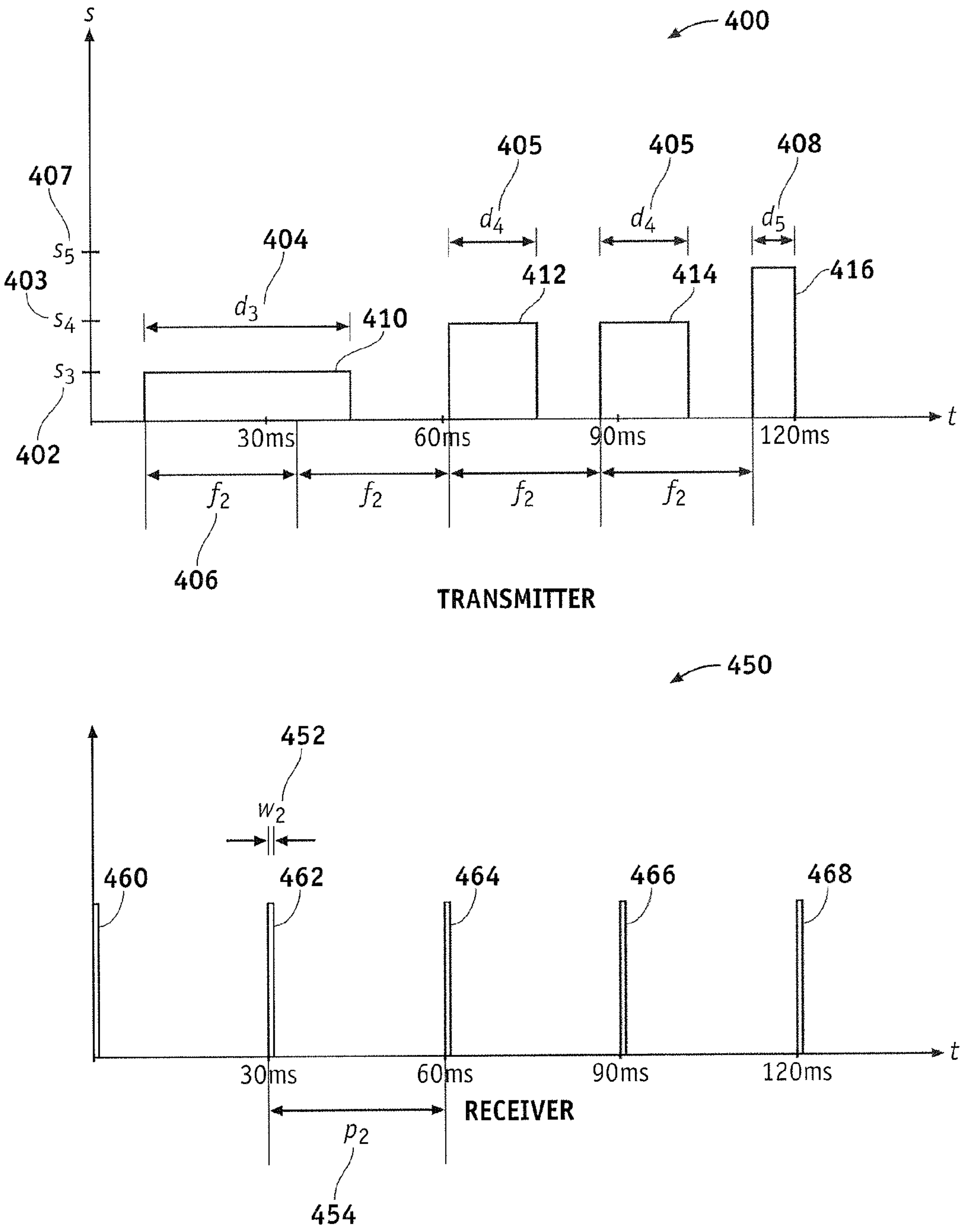
FIG. 4 is a signal diagram of another embodiment of a wireless transmitter and receiver.

FIG. 4 illustrates another embodiment of a signal transmission pattern 400. Unless otherwise specified, the receiver activations 450 are substantially similar to those described with respect to FIG. 3, except that the indicators of the window 452 and polling frequency 454 have been incremented by 1 and the component numbers have been incremented by 100. Additionally, the signal transmit rate or frequency 406, $f_2$, is constant, though it can vary, and is greater than the polling frequency 454, $p_2$. Accordingly, the interval between signal transmissions is shorter than the interval between receiver activations.

The transmission pattern 400 has a first pulsed signal transmission 410 with a first transmission field strength 402 of $s_3$ and first transmission duration 404 of $d_3$. The second and third pulsed signal transmissions 312, 314 can have a second transmission field strength 403 of $s_4$ and second transmission duration 405 of $d_4$. Subsequent pulsed signal transmissions, such as the fourth signal transmission 316, can have substantially the same transmission field strength 407 $s_5$ and transmission duration 408 $d_5$. Preferably, the first transmission field strength 402 is weaker or lower than the second transmission field strength 403 which, in turn, is weaker or lower than the third transmission field strength 407. Conversely, the first signal transmission duration 404 is preferably longer than the second transmission duration 405, which is longer than the third transmission duration 408. Preferably, the average transmission field strength over the transmission duration for each pulsed signal transmission 410, 412, 414, 416 is at or below a predetermined average value.

In some embodiments, a transmission pattern 400 can be used to convey information in a signal from a wireless transmitter to a wireless receiver. In some embodiments, either the first or the second and third signal transmissions 410, 412, 414 can be repeated more than once prior to repeated transmission of the signal at the final, highest field strength. In certain embodiments, the second signal transmission 412 can be at the second transmission field strength 403 and for the second duration 405, while the third signal transmission 414 is at the third transmission field strength 407 and for the third duration 408.

With reference again to FIG. 1, the key fob 10 comprising a wireless transmitter can be configured to transmit a signal in any of the patterns previously described, and variations thereof. As one example of an embodiment, the key fob 10 can be configured to transmit an irregular pattern of four signal transmissions having four different, increasingly strong, signal transmission field strengths, each signal transmission having correspondingly shorter transmission durations. In another embodiment, the key fob 10 can broadcast in a regular pattern as illustrated in FIG. 2. In some embodiments, the key fob 10 can alternate between or rotate among different signal transmission patterns as desired. In response to conveyance of information from the key fob 10 to the wireless receiver, the vehicle 20 can perform an operation, such as activating an alarm, unlocking a door or doors, adjusting the height of at least one window, opening the vehicle's trunk or hatch, and the like. In embodiments where the wireless communication system is embodied in an alternative system, such as a garage door opening/closing system, the system can perform an appropriate operation, such as opening a garage door, in response to receiving a signal from the wireless transmitter.

The various tasks performed in connection with sequence 500 may be performed by software, hardware, firmware, or any combination thereof. For illustrative purposes, the following description of sequence 500 may refer to elements mentioned above in connection with FIGS. 1-4. In practice, portions of sequence 500 may be performed by different elements of the described system, e.g., a wireless transmitter, a wireless receiver, and/or a control system. It should be appreciated that sequence 500 may include any number of additional or alternative tasks, the tasks shown in FIG. 5 need not be performed in the illustrated order, and sequence 500 may be incorporated into a more comprehensive procedure or process having additional functionality not described in detail herein.

Figure 5:
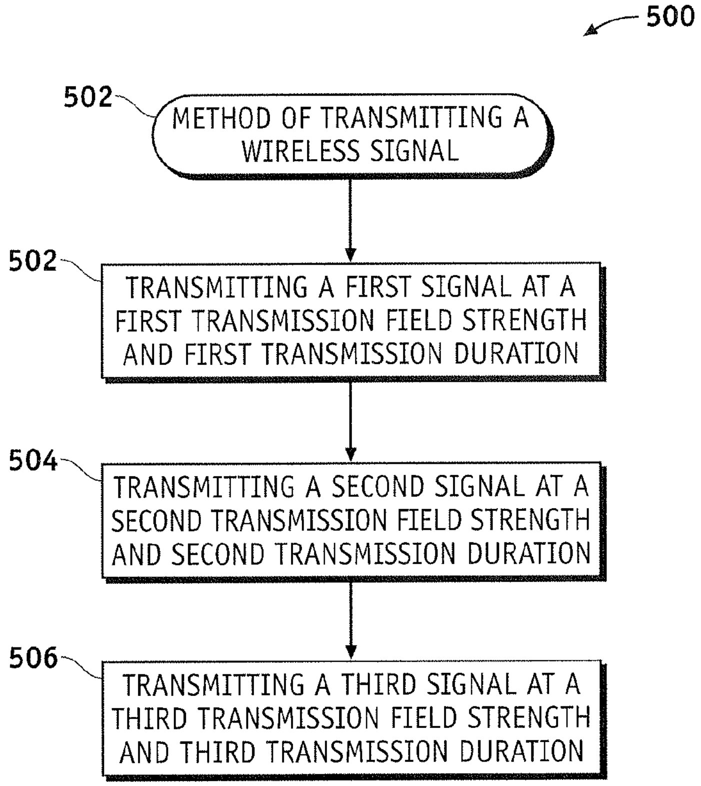
FIG. 5 is a flow chart that illustrates an embodiment of a wireless communication method.

FIG. 5 illustrates a sequence 500 of steps of a method of transmitting a wireless signal. In at least one embodiment, a first signal can be transmitted 502 at a first transmission field strength and over a first transmission duration. A second signal can be transmitted 504 after the first signal, the second signal transmitted at a second transmission field strength and over a second transmission duration. Preferably, the first transmission field strength is lower than the second transmission field strength and the first transmission duration is longer than the second transmission duration. Optionally, a third signal can be transmitted 506 after the second signal. The third signal can be transmitted at a third transmission field strength and over a third transmission duration. Preferably, the second transmission field strength is lower than the third transmission field strength and the second transmission duration is longer than the third transmission duration.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application

What is claimed is:

1. A method of transmitting a wireless key fob signal comprising:

transmitting a first key fob signal at a first transmission field strength, the first key fob signal having a first transmission duration, and the first key fob signal transmitted from a key fob device;

transmitting a plurality of successive key fob signals from the key fob device after transmitting the first key fob signal, each of the plurality of successive key fob signals having a second transmission field strength and a second transmission duration, wherein the first transmission field strength is less than the second transmission field strength and the first transmission duration is longer than the second transmission duration;

wherein the plurality of successive key fob signals are transmitted at a frequency that defines a transmission interval between the plurality of successive key fob signals, and the first transmission duration is longer than the transmission interval.

2. The method of claim 1, wherein transmitting the first key fob signal comprises transmitting only one cycle of the first key fob signal before transmitting the plurality of successive key fob signals.

3. The method of claim 1, further comprising receiving either of the first and second key fob signals with a wireless receiver, wherein the wireless receiver polls for the first and second key fob signals.

4. The method of claim 3, further comprising performing a vehicular interaction operation in response to receiving at least one of the first and second key fob signals.

5. The method of claim 4, wherein performing a vehicular interaction operation comprises at least one of unlocking a door of a vehicle, unlatching a hatch of a vehicle, activating an alarm of a vehicle, and adjusting a height of a window of a vehicle.

6. A wireless communication system comprising:

a wireless transmitter to transmit a first signal having a first transmission field strength and a first transmission duration, and to transmit a plurality of successive signals, each having a second transmission field strength and a second transmission duration, where the first transmission field strength is less than the second transmission field strength and the first transmission duration is greater than the second transmission duration; and a wireless receiver to detect signals at a signal detection interval and to receive the first signal and the plurality of successive signals;

wherein the plurality of successive key fob signals are transmitted at a frequency that defines a transmission interval between the plurality of successive key fob signals, the first transmission duration is longer than the transmission interval, the second transmission duration is shorter than the transmission interval, the first transmission duration is longer than the signal detection interval, and the transmission interval is shorter than the signal detection interval.

7. The wireless communication system of claim 6, wherein the signal detection interval is constant.

* * * * *